United States Patent [19]
Winzer

[11] Patent Number: 4,590,619
[45] Date of Patent: May 20, 1986

[54] STAR COUPLER FOR LOCAL NETWORKS OF OPTICAL COMMUNICATIONS SYSTEM

[75] Inventor: Gerhard Winzer, Putzbrunn, Fed. Rep. of Germany

[73] Assignee: Siemens Aktiengesellschaft, Berlin & Munich, Fed. Rep. of Germany

[21] Appl. No.: 607,813

[22] Filed: May 7, 1984

[30] Foreign Application Priority Data

Jun. 28, 1983 [DE] Fed. Rep. of Germany ....... 3323317

[51] Int. Cl.⁴ .............................................. H04B 9/00
[52] U.S. Cl. .................. 455/612; 350/96.15; 455/607
[58] Field of Search ............... 455/607, 612, 606, 610; 350/96.15, 96.16, 96.19, 96.17, 96.18, 171

[56] References Cited

U.S. PATENT DOCUMENTS 4,446,515  5/1984  Sauer et al. ........................ 455/607

FOREIGN PATENT DOCUMENTS 58-60842  4/1983  Japan .................................. 455/612

OTHER PUBLICATIONS

Finley, Jr., "Optical Fibers in Local Area Networks", IFOC, vol. V, pp. 47-55.
Winzer, "Single-Mode and Multimode All-Fiber Directional Couplers for WDM", Applied Optics, vol. 20, No. 18, Sep. 15, 1981, pp. 3128-3135.

*Primary Examiner*—Joseph A. Orsino, Jr.
*Attorney, Agent, or Firm*—Hill, Van Santen, Steadman & Simpson

[57] ABSTRACT

A star coupler for an optical data bus system in a star configuration or other local networks comprises a passive optical star coupler in the form of a transit mixer which distributes the optical signals, transmitted by subscriber transmitters and supplied to the passive optical star coupler by incoming optical waveguides and output via outgoing optical waveguides. The star coupler exhibits an additional optical transmitter whose optical signals are likewise capable of being input coupled in the passive optical star coupler, as well as a listening device for listening to the optical signals supplied to the passive optical star coupler in the incoming optical waveguides. The listening device emits signals which are related to the detected signals. Embodiments of a star coupler with a passive optical reflection star coupler are also described.

20 Claims, 5 Drawing Figures

STAR COUPLER FOR LOCAL NETWORKS OF OPTICAL COMMUNICATIONS SYSTEM

BACKGROUND OF THE INVENTION

1. Field of the Invention

The present invention relates to a star coupler for local networks of optical communications systems, particularly for optical data bus systems constructed in a star configuration, comprising a passive optical star coupler for distributing one or more optical signals transmitted by subscriber stations and capable of being supplied to the passive optical star coupler via incoming optical waveguides of the network and supplied over outgoing waveguides of the star coupler.

2. Description of the Prior Art

An example of a local network of optical message transmission is an optical data bus constructed in a star configuration. Such data buses, up to the present, are constructed either with a passive optical star coupler or with an active, electrically-operating star coupler, between the incoming and outgoing optical waveguide (cf. M. R. Finley, "Optical Fibers in Local Area Networks—A Review of Current Progress", IFOC Vol. V, 1983, Handbook and Buyers Guide, pp. 47-55). Both variations have considerable advantages and disadvantages in relation to one another. An advantage of the variation utilizing a passive star coupler is that, for N subscribers, a total of only N transmitters is required which are arranged in the subscriber stations. In the configurations utilizing an active star coupler, yet an additional transmitter must be provided at the output side of the star coupler per subscriber. In exchange, with this configuration, the expense for collision recognition and open-wire line configuration drops considerably because the respective installations are necessary only once in a central processing system.

SUMMARY OF THE INVENTION

The object of the present invention is to provide a star coupler of the type generally set forth above which is characterized by an additional optical transmitter, whose optical signals are capable of being coupled in the passive optical star coupler, and by a listening device for listening to the optical signals supplied to the passive optical star coupler in the incoming optical waveguides and which emits signals which correspond to the signals listed to by the listening device.

With a star coupler constructed in accordance with the present invention, a hybrid star coupler has been produced which, in relation to the data transport in the physical medium, exhibits the behavior of a passive optical star coupler and in which only the one transmitter in the subscriber station is required per subscriber. The chronological data flow is not interrupted by processing times in a processing installation.

A star coupler constructed in accordance with the present invention combines the aforementioned advantages of a passive star coupler and an active star coupler and the advantages of the operational types for both types of couplers can advantageously cooperate in a single operating mode.

BRIEF DESCRIPTION OF THE DRAWINGS

Other objects, features and advantages of the invention, its organization, construction and operation will be best understood from the following description, taken in conjunction with the accompanying drawings, on which.

DESCRIPTION OF THE PREFERRED EMBODIMENTS

Figure 1:
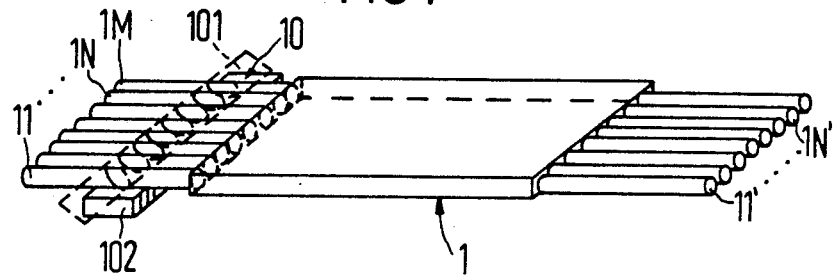
FIG. 1 is a perspective view of a first embodiment of a hybrid star coupler having a passive optical transit star coupler.

Referring to FIG. 1, a passive optical transit star coupler 1 comprises a transit mixer in the form of a small mixer plate. On the left end face of the small mixer plate 1, on its input side, a plurality of incoming optical waveguides 11-1N, in the form of glass fibers, are coupled, which supply to the small mixer plate 1 optical signals from subscriber transmitters (not illustrated). Coupled to the opposite, right end face of the small mixer plate 1, on its output side, is a plurality of outgoing glass fiber optical waveguides 11'-1N'.

An optical signal supplied to the small mixer plate 1 in an incoming fiber 11-1N is distributed by the small mixer plate to all outgoing fibers 11'-1N'.

Instead of the small mixer plate, all other mixer structures, for example, such using biconical tapers, can be employed in order to realize the passive optical star coupler.

In contrast with the conventional passive transit star coupler, the hybrid transit star coupler according to FIG. 1 exhibits a listening device 10 arranged in the incoming fibers 11-1N, and one additional transmitter in addition to the present subscriber transmitters which is, for example, arranged in a central unit 100 (FIG. 2) and whose optical signals are capable of being supplied to the small mixer plate 1 via an additional incoming fiber 1M, likewise coupled to the left end face of the mixer plate 1.

The listening device 10 comprises an output coupling device in the form of a semitransmissive reflector 101 obliquely arranged in the incoming fibers, and a detector field 102.

The semitransmissive reflector 101, intersecting the incoming fibers 11-1N, is, for example, so arranged that its reflecting plane extends perpendicularly to the axes of the incoming fibers 11-1N and includes an angle of between 0° and 90°, for example an angle of 45°, with the plane in which the incoming fibers are arranged.

Through the semitransmissive reflector 101, a fraction of every optical signal supplied in an incoming fiber 11-1N is laterally reflected out of the fiber.

The reflector field is so dimensioned that there is associated with every incoming fiber 11-1N, precisely in each instance, one detector which is so arranged that it essentially receives only the signal component output coupled from its associated fiber.

The semitransmissive reflector 101 can, for example, be realized like a semitransmissive reflector in the case of known optical waveguide branch elements according to the beam splitter principle (in this regard reference may be taken to G. Winzer, H. F. Mahlein and A. Reichelt, Appl. Opt. Vol. 20, 1981, pp. 3128-3135).

However, for the output coupling device, also every other output coupling principle enters into consideration. Also, the location of the partial light output coupling can reside in the transit mixer 1 itself. For the configuration according to FIG. 1, it is only necessary that the output coupling be carried out at a point at which, as yet, no mixing of the supplied optical signals has taken place so that the output-coupled light permits an identification of the subscriber.

The detectors of the detector field 102 are expediently read in parallel. The coincidence of two or more supplied signals in one of the incoming optical guides 11-1N can be recognized as well as the lack of any optical signals whatsoever in the incoming fibers 11-1N.

Figure 2:
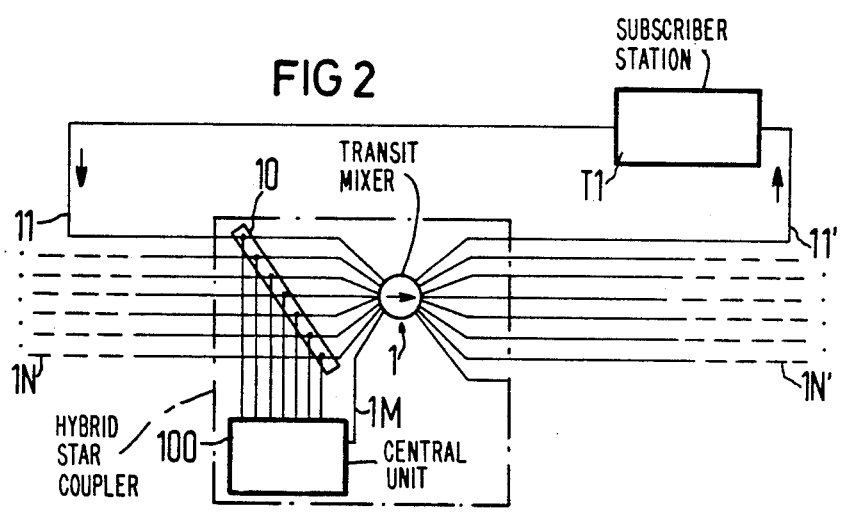
FIG. 2 is a schematic illustration of the arrangement of the hybrid star coupler of FIG. 1 in an optical data bus in a star configuration.

In the data bus system in star configuration illustrated in FIG. 2, with an installed hybrid star coupler according to FIG. 1, the coincidence of signals of two or more of the incoming fibers 11-1N in a central processing installation 100 (central unit), for example, connected with the detector field 102, can, for example, be recognized as a collision and the lack of any optical signals in the incoming fibers to be recognized as an open-wire line state. In the central unit 100 also the additional transmitter is arranged which is connected via the additional incoming fiber 1M with the transmit mixer 1 and thereby via outgoing fibers 11'-1N' with the subscriber receivers of all subscriber stations, of which only one station T1 is illustrated in FIG. 2.

By way of the additional incoming fiber 1M, for example, jamming signals can be transmitted and, if necessary, central control data can also be transmitted to all subscribers.

If the data bus system or local network does not operate with too high a bit rate, the detector field 102, read in parallel, can also be replaced by a sequentially-read detector field having charge carrier storage.

Figure 3:
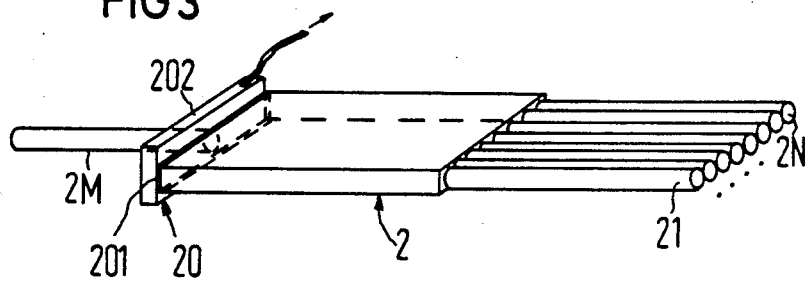
FIG. 3 is a perspective view showing the arrangement of the hybrid star coupler of FIG. 1 in an optical data bus in a star configuration.

In the case of a hybrid star coupler according to FIG. 3, the passive optical reflection star coupler 2 comprises a reflection mixer, for example, again in the form of a small mixer plate. Coupled to the right end face of the mixer plate 2, on its incoming side is a plurality of incoming optical waveguides 21-2N in the form of fibers, which supply optical signals from (non-illustrated) subscriber transmitters to the small mixer plate 2. On the opposite, left end face of the small mixer plate 2, a reflector plate is applied which reflects back the supplied optical signals in the direction of the incoming fibers 21-2N from which they are conducted.

The incoming fibers 21-2N therefore simultaneously form the outgoing optical waveguides of the reflection mixer 2. The mixer plate 2 has the same function as the mixer plate 1 of the transit mixer, i.e. it distributes the supplied optical signals over the outgoing fibers and mixes the optical signals, as in the case of the mixer plate 1.

In contrast to the conventional passive optical star reflection coupler, the hybrid reflection star coupler according to FIG. 3 exhibits a listening device 20, provided on the reflector 201, and an additional transmitter in addition to the present subscriber transmitters, which additional transmitter is arranged, for example, in a central unit 200 (FIG. 4) and whose optical signals are capable of being supplied to the small mixer plate 2 via an additional short incoming fiber 2M to the left end face of the small mixer plate 2.

The output coupling device of the listening device 20 comprises the reflector 201, which, in the present case, is designed in the form of a semitransmissive reflector, so that a fraction of the light supplied to the latter can pass through it to an optoelectric transducer, for example, a photodiode 202 which is supplied on the reflector 201. In the photodiode 202, an opening is designed through which the additional fiber 2M projects and extends to the reflector 201. The position of the input coupling location for the optical signals from the additional transmitter can also be next to the photodiode 202. In both instances, the optical signals from the additional transmitter, aside from stray light, do not reach the photodiode.

Figure 4:
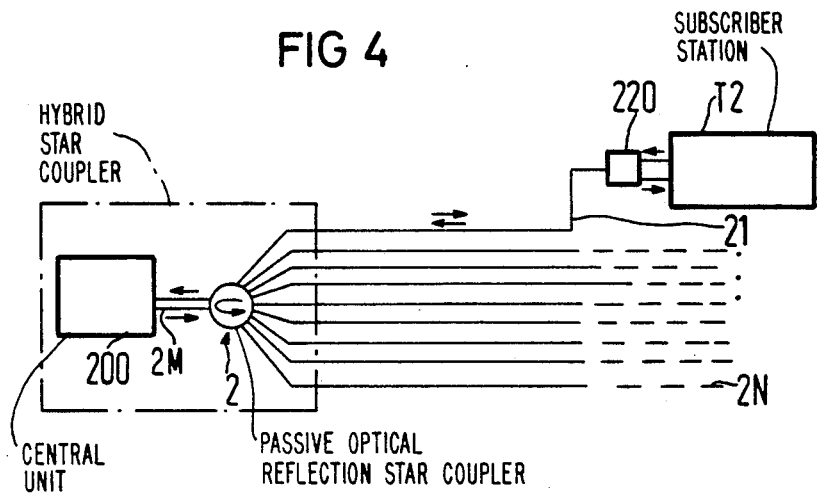
FIG. 4 is a schematic representation of the arrangement of the hybrid star coupler according to FIG. 3 in an optical data bus in star configurations.

In the data bus system in star configuration illustrated in FIG. 4, with an installed hybrid star coupler according to FIG. 3, the signal from the photodiode 202 is evaluated in the central processing unit 200 (central unit). In contrast to the embodiment according to FIGS. 1 and 2, however, the possibility is lacking here of identifying the transmitting subscriber through fiber assignment.

In the central unit 200, the additional transmitter is arranged which input couples optical control signals, for example, jamming signals, via the additional fiber 2M and via the small mixer plate 2 into the data bus.

Figure 5:
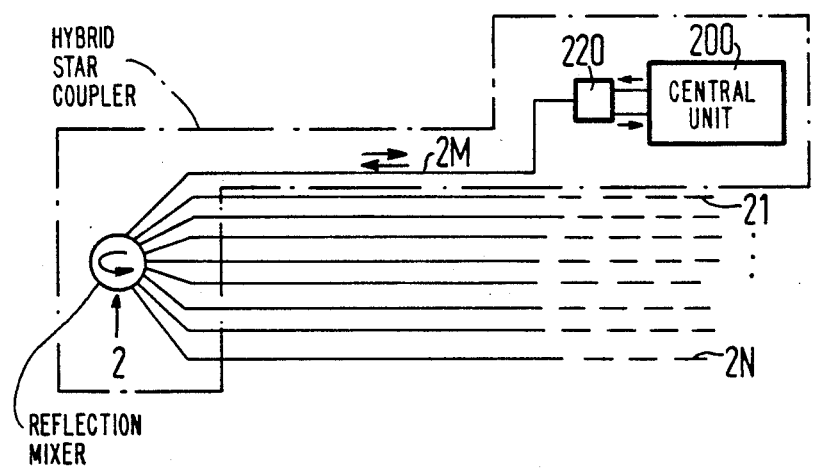
FIG. 5 is a schematic representation of the arrangement of the modified embodiment of the star coupler according to FIG. 3 in an optical data bus in a star configuration.

In the data bus system in a star configuration, as illustrated in FIG. 5, with the installed, modified embodiment of the hybrid reflection coupler, the reflector of the reflection mixer is not designed as a semitransmissive reflector, but, as previously, in the form of a fully-reflecting reflector. The additional fiber 2M leading from the additional transmitter in the central unit 200 to the reflection mixer 2, like the incoming and outgoing fibers 21-2N, is coupled on the input side of the reflection mixer. This incoming fiber 2M simultaneously serves as an outgoing fiber in which a portion of the light reflected from the reflector is coupled out. This coupled-out light is supplied by the fiber 2M, as in the case of the fibers 21-2N, leading away to the subscriber stations T1 (FIG. 4) via a duplexer 220 to an optoelectric transducer arranged, for example, in the central unit 200.

Accordingly, in the embodiment according to FIG. 5, the output coupling device of the listening device 5, comprises the reflector of the outgoing fiber 2M and a duplexer. In a fashion similar to how a hybrid star coupler is installed in the illustrated data buses, it can also be installed in other local networks.

Although the operating mode and subscriber identification has been described only on the basis of the figures 1 and 2 for the arrangement with a transit mixer, this method of operation is also possible in conjunction with a correspondingly-modified reflection mixer. Likewise, the method of operation can also be carried out with collision recognition and open-wire line recognition without subscriber identification, which was only illustrated for the arrangement with a reflection mixer, in an arrangement with the correspondingly-modified transit mixer.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Star coupler apparatus for connection and coupling between a plurality of incoming light waveguides and a plurality of outgoing light waveguides, comprising:
   a passive star coupler including a mixing plate for distributing optical signals transmitted by transmitters in a plurality of subscriber stations coupled to the incoming light waveguides through said mixing plate;
   an additional optical transmitter coupled to said mixing plate; and
   listening means optically coupled to the incoming light waveguides and operable to control said additional optical transmitter, said listening means comprising an output coupling device for partially coupling optical signals incoming from the incoming light waveguides, said output coupling device comprising a semitransmissive reflector arranged in the light paths of the incoming light waveguides.

2. The star coupler of claim 1, and further comprising:
   a signal processing system connected between said listening means and said additional optical transmitter.

3. The star coupler of claim 1, wherein:
   said output coupling device is disposed in the incoming light waveguides.

4. The star coupler of claim 1, wherein:
   said output coupling device is disposed in the mixing plate.

5. The star coupler of claim 1, and further comprising:
   an optoelectric transducer connected between said output coupling device and said additional optical transmitter.

6. The star coupler of claim 1, wherein:
   the passive star coupler comprises a transit star coupler.

7. The star coupler of claim 1, wherein:
   the passive star coupler comprises a reflection star coupler.

8. Star coupler apparatus for connection and coupling between a plurality of incoming light waveguides and a plurality of outgoing light waveguides, comprising:
   a passive star coupler including a mixing plate for distributing optical signals transmitted by transmitters in a plurality of subscriber stations coupled to the incoming light waveguides through said mixing plate;
   an additional optical transmitter coupled to said mixing plate;
   listening means optically coupled to the incoming light waveguides and operable to control said additional optical transmitter;
   said passive star coupler comprising a transit star coupler.

9. Star coupler apparatus for connection and coupling between a plurality of incoming light waveguides and a plurality of outgoing light waveguides, comprising:
   a passive star coupler including a mixing plate for distributing optical signals transmitted by transmitters in a plurality of subscriber stations coupled to the incoming light waveguides through said mixing plate;
   an additional optical transmitter coupled to said mixing plate;
   listening means optically coupled to the incoming light waveguides and operable to control said additional optical transmitter;
   an output coupling device in said listening means including a semitransmissive reflector coupled to the incoming light waveguides; and
   an optoelectric transducer including a detector field comprising a plurality of optoelectric detectors each coupled to a respective incoming light waveguide for receiving only its respective light component.

10. The star coupler of claim 9, wherein:
    said additional optical transmitter is coupled to an incoming light waveguide.

11. The star coupler of claim 9, wherein:
    said semitransmissive reflector is arranged in the incoming light waveguides oblique to their axes.

12. The star coupler of claim 11, and further comprising:
    reading means for reading said optoelectric detectors in parallel.

13. The star coupler of claim 11, wherein: said detector field comprises a sequentially-readable charge storage device.

14. Star coupler apparatus for connection and coupling between a plurality of incoming light waveguides and a plurality of outgoing light waveguides, comprising:
    a passive star coupler including a mixing plate for distributing optical signals transmitted by transmitters in a plurality of subscriber stations coupled to the incoming light waveguides through said mixing plate;
    an additional optical transmitter coupled to said mixing plate;
    listening means optically coupled to the incoming light waveguides and operable to control said additional optical transmitter; and
    an output coupling device in said listening means including a semitransmissive reflector optically coupled to said star coupler at a point where each incoming optical signal is already distributed to all outgoing light waveguides.

15. The star coupler of claim 14, wherein:
    each incoming waveguide is coupled to one end of said mixing plate and also constitutes an outgoing light waveguide; and
    said semitransmissive reflector is the opposite end of said mixing plate and receives the already distributed signals.

16. The star coupler of claim 15, wherein:
    said semitransmissive reflector constitutes the reflector of a reflection star coupler.

17. The star coupler of claim 15, and further comprising:
    an optoelectric transducer carried on said semitransmissive reflector.

18. The star coupler of claim 17, wherein:
    said additional transmitter is coupled to said semitransmissive reflector.

19. The star coupler of claim 18, wherein:
    at least said optoelectric transducer includes a window for transit of light from one additional incoming light waveguide, said one additional incoming light waveguide coupled to said additional transmitter.

20. The star coupler of claim 19, wherein:
    said semitransmissive comprises a window aligned with the window of said optoelectric transducer.

* * * * *